Patented Feb. 14, 1939

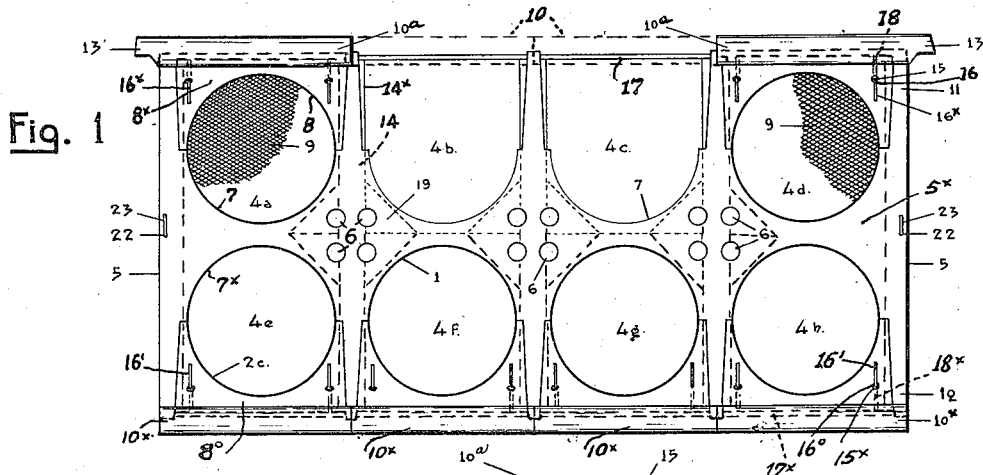
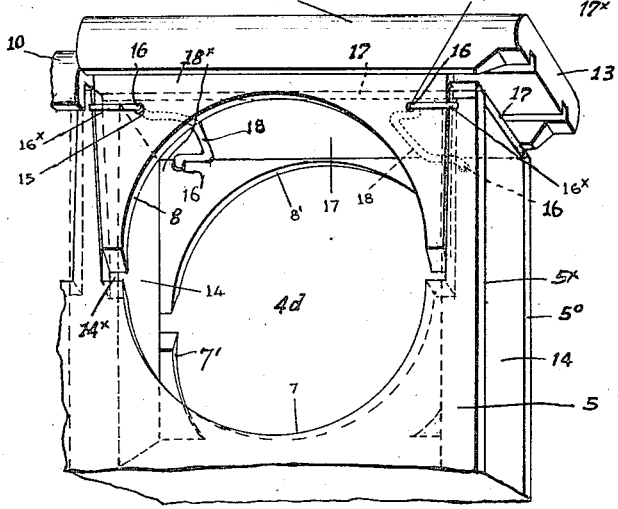
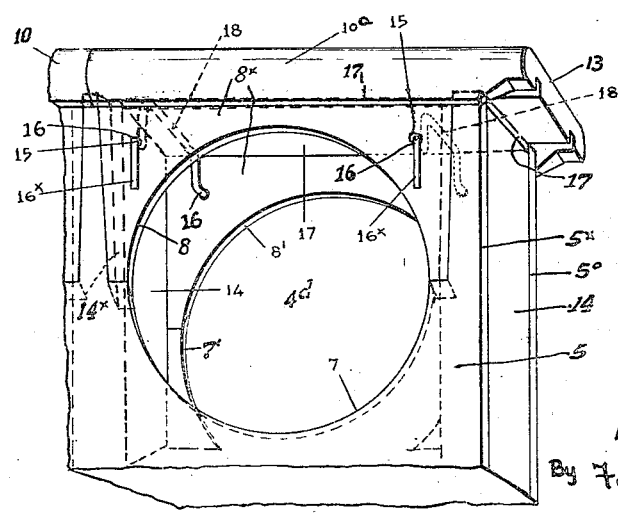

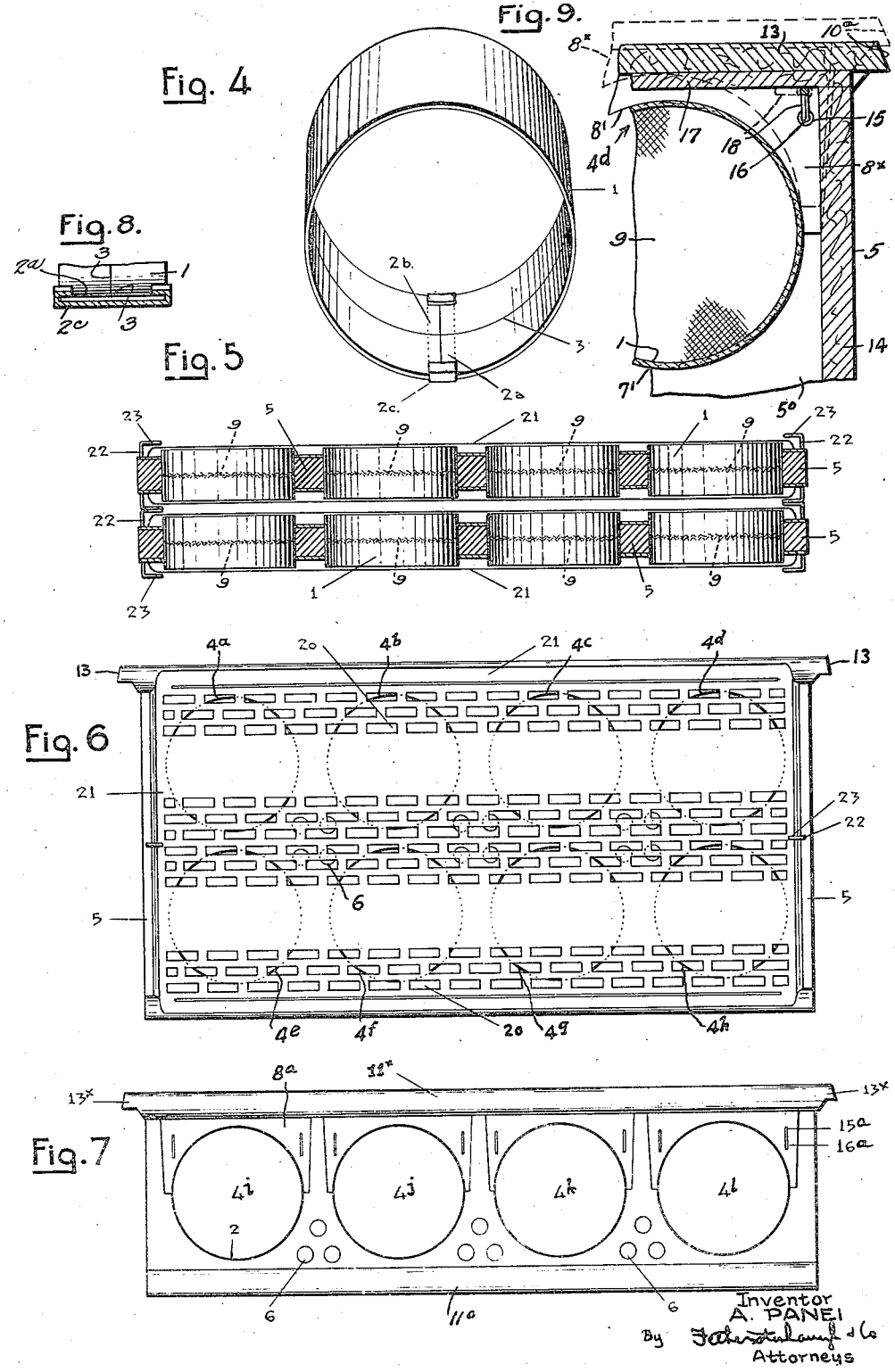

2,146,844

UNITED STATES PATENT OFFICE 2,146,844

HONEYCOMB FRAME

Alejandro Panei, Buenos Aires, Argentina

Application April 11, 1935, Serial No. 15,790

7 Claims. (Cl. 6—10)

In the sale of honey up to the present time, the object has been to protect the buyer against adulterations, by providing sections in which the cells constructed and filled by bees are directly contained. These sections are square sections and are only reproductions on a smaller scale of big sections used when the bee-keeper intends selling his honey already extracted.

These square sections have, however, the disadvantage that, in spite of their reduced size, they break very easily when on sale or during delivery before arriving upon the table of the consumer and, therefore, instead of a clean, well presented article, there is a smeary paste of honey and wax filling, an unsightly mixture in the receptacle which is supposed to contain the honey section.

I found that this inconvenience easily can be avoided by forming the sections or honeycombs circular instead of square, which prevents the section or honeycomb from being ruptured or broken by an oblique blow such as generally produces the rupture of square sections. Furthermore, the circular shape gives a better appearance to the section.

I shall now describe the best way of proceeding to produce these round honeycombs and for this purpose I shall have reference to the accompanying drawings in which:—

Figure 1 is a vertical elevation of a frame constructed so as to contain eight sections, but instead of containing these eight, it also might contain only two big ones.

Figure 2 is an enlarged perspective view of a fragmentary portion of the frame shown in Figure 1 and in an open position for receiving a section or honeycomb.

Figure 3 is a similar view to Figure 2 but shown in closed position.

Figure 4 is a perspective view of a section or comb before being used, viz. before being placed into one of the cavities of the frame.

Figure 5 is a sectional plan view through my frame and the combs held therein and the excluders as illustrated in Figure 6.

Figure 6 is a vertical elevation of my frame and divider or excluder attached thereto and which covers the frame shown in Figure 1.

Figure 7 illustrates a low frame containing only four sections.

Fig. 8 is a fragmentary sectional view through the clip 2c and honeycomb 1.

Fig. 9 is a fragmentary corner sectional view showing the comb held in position by full lines and the opening enlarged for withdrawal or replacement in dotted lines.

In the drawings like characters of reference indicate corresponding parts.

1 indicates the honeycomb or section consisting of a thin wooden strip bent into circular form, the extremities $2a$ and $2b$ of which are secured together by means of a small metal strip $2c$. These ends may be secured together by any other suitable means. In the centre of the interior on the line 3 is secured a central wax diaphragm forming a foundation on both sides of which the bees construct the honey cells. This foundation is indicated at 9 in the cavities $4a$ and $4d$ of Figures 1 and 9.

The sections or honeycombs 1 when placed in the bee-hive (not shown) are held in a frame 5 which is provided with openings 6 of sufficient size to allow the bees to pass from one side of the frame to the other, and it is also provided with larger openings or cavities $4a$ to $4h$ into which the annular comb sections 1 are placed.

In order to introduce the sections 1 easily into the openings $4a$ to $4d$, the inner halves 7 and 7' of the openings are formed respectively in the stationary front and rear walls $5^\times$ and $5^0$ of the frame 5. The outer halves 8 and 8' of the openings oppose the inner halves 7 and 7' and are formed in the movable members $8^\times$ which are separate from the frame and are integral with the bar portions 10 and 10a. The bar portions 10 and 10a are normally in longitudinal alignment and abut end to end to form a complete bar extending along the upper face of the frame 5. The bar portions 10a form the ends of the complete bar and are provided with outwardly extending projections 13 for the suspension of the frame in the bee-hive.

The openings $4e$—$4h$ are formed similarly to the openings $4a$—$4d$. The part in which the inner halves $7^\times$ of the openings $4e$—$4h$ are formed is integral with the front wall $5^\times$ of the frame 5 and the halves of these openings corresponding to the halves 7' (not shown) are integral with the rear wall $5^0$ of the frame 5. The outer halves of openings $4e$—$4h$ corresponding to the half openings 8 and 8' are formed in the members $8^0$ which are integral with the bar portions $10^\times$ which, when in their normal position against the lower face of the frame, form a complete bar extending from end to end of the frame without any projecting portions extending from the ends of the complete bar corresponding to the projections 13 of the portions 10a of the upper bar.

14 are transverse walls extending between the front and rear walls $5^x$ and $5^0$ of the frame 5. Between each vertical edge of each transverse wall 14 and the front and rear walls $5^x$ and $5^0$ of the frame 5 are formed guideways $14^x$ in which the members $8^x$ and $8^0$ slidably fit.

17 and $17^x$ are the top and bottom walls of the frame 5, such top wall extending between the front and rear and over the transverse walls 14 to which they are secured. The front and rear portions of the exterior members $8^x$ and $8^0$ are provided respectively with perforations 15 and $15^x$. The perforations 15 are located below the wall 17 and the perforations $15^x$ above the wall $17^x$. 16 and $16^0$ are wire rods extending respectively through the perforations 15 and $15^x$ of the front and rear portions of the members $8^x$ and $8^0$. Each wire rod 16 and $16^0$ is provided respectively with crank portions 18 and $18^x$ broad U-shaped in form, as will be seen in referring to Figs. 2 and 3. The wires 16 and $16^0$ are provided with operating handles $16^x$ and $16'$ respectively.

As indicated in Fig. 9, the top bar portions $10a$ are fastened to upper members $8^x$ as are also the portions 10 together forming single units which are adapted to rest on the top wall 17 of the frame 5. The bar portions $10^x$ are similarly fastened to the lower members $8^0$ to form single units resting against the bottom wall $17^x$. The wires 16 extending through the perforations 15 prevent the units 10 or $10a$ being lifted further than is indicated by the dotted lines in Figure 9. Similarly the lower bar portions $10^x$ are limited in their movement by the wire rods $16^0$.

If it is desired to fasten honeycombs 1 in any one of the upper openings $4a$—$4d$ of the frame 5, the members $8^x$ having the top bar portions 10 or $10a$ are moved into the position shown in Fig. 2 and honeycombs placed in position on the edges of the inner halves 7 and $7'$ of the openings. The wires 16 are then turned until the bases of the U shaped cranks 18 hit against the top wall 17, thus forcing the members $8^x$ inward in the guides $14^x$ into the closed position indicated in Fig. 3, securely fastening the comb in place between the edges of the half openings 8 and $8'$ and the edges of the half openings 7 and $7'$.

Combs are placed in position in the openings $4e$—$4h$ in a manner similar to the above.

The inner half openings 7 and $7'$, being formed in the front and rear walls of the main frame, remain stationary. Between the front and rear walls of the frame and between the half openings 7 and $7'$ are secured triangular wooden pieces 19 as indicated by dotted lines in Fig. 1.

The frames 5 are suspended within the beehive by means of the projections 13 and dividers or excluders 21 provided with the usual openings 20 of a size sufficient for the passage of the bees.

In Fig. 6 a divider or excluder 21 is shown which is placed directly against the frame 5 and is attached to the frame by means of pivoted catches 22 having turned portions 23 which engage the edges of the excluder so that they may be easily attached or freed whenever desired.

It will be understood that the size of the frame, the number of cavities which it contains as well as the dimensions of the cavities for the sections or honeycombs may vary and will vary according to the size of the bee-hive.

Instead of the upper bars being divided into bar portions 10 and $10a$ and the lower bar into bar portions $10^x$, they may be in the form of a single undivided upper bar $11^x$ and a single undivided lower bar $11^0$ as indicated in Fig. 7, the upper bar $11^x$ being provided with end projecting portions $13^x$ similar to the projections 13 of Figs. 1–3. In this case, the members $8a$ forming the outer half of the openings $4i$–$4l$ and corresponding to the members $8^x$ of Figs. 1 to 3, move outwardly simultaneously when operated by the rods $15a$ and handles $16a$, corresponding to the rods 16 and handles $16^x$ of Fig. 1. Whereas, in the case where the upper bars are divided into bar portions 10 and $10a$, the members $8^x$ move outwardly individually and independently of the other bar portions 10 or $10a$.

In Fig. 1 the wires 16 are provided on both sides of each outer member $8^x$ due to the top bar being divided into separate portions 10 and $10a$. When a single bar $11^x$ is used as indicated in Fig. 7 extending from end to end of the frame, a few of these wires could be omitted, placing perhaps a wire only at each end of the bar $11^x$ and for greater safety two other wires at the centre of the bar $11^x$.

It will be seen from this description that the frame and the circular combs which it contains are very easily handled, and due to this ease of handling and due to its compactness as, for example, where a single frame is placed between two excluders in the hive, it is possible to use a minimum space within the brood chamber of a new swarm, whereas with square sections now in use this is quite impossible.

I claim:

1. A holding frame for honeycombs comprising a stationary member and movable members guided in the stationary member, the stationary member and each of the movable members together forming a receiving cavity for a honeycomb, and a bar extending longitudinally of the frame and projecting beyond the ends thereof and to which the movable members are connected.

2. A holding frame for honeycombs comprising a stationary member and movable members guided in the stationary member, the stationary member and each of the movable members together forming a receiving cavity for a honeycomb, and means extending transversely of the frame for moving the movable members.

3. A holding frame for honeycombs comprising a stationary member and movable members guided in the stationary member, the stationary member and each of the movable members together forming a receiving cavity for a honeycomb, and means extending transversely of the frame for individually moving the movable members inward.

4. A holding frame for honeycombs comprising a stationary member having U-shaped recesses extending inward from an edge thereof, guideways formed in the parallel sides of each recess, and movable members slidable in the guideways and each having a recess opposing the recess of the stationary member to together form a comb receiving cavity.

5. A holding frame for honeycombs comprising a stationary member having U-shaped recesses extending inward from an edge thereof, guideways formed in the parallel sides of each recess, movable members slidable in the guideways and each having a recess opposing the recess of the stationary member to together form a comb receiving cavity, a horizontal wall portion extending between the outer ends of each U-shaped recess, and a device carried by each movable member and coacting with the wall portion to carry such movable member inward.

6. A holding frame for honeycombs comprising a stationary member having U-shaped recesses extending inward from an edge thereof, guideways formed in the parallel sides of each recess, movable members slidable in the guideways and each having a recess opposing the recess of the stationary member to together form a comb receiving cavity, a horizontal wall portion extending between the outer ends of each U-shaped recess, and a crank journalled in each movable member and coacting with the horizontal wall portion to impart inward movement to the movable member.

7. A holding frame for honeycombs comprising a stationary member and a plurality of comb receiving recesses formed in the stationary member, and a plurality of movable members guided vertically in the stationary member, each movable member opposing a recess of the stationary member to form comb receiving openings, a bar extending longitudinally of the frame to which the movable members are secured, and means for moving the movable members inward adapted to limit their outward movement.

ALEJANDRO PANEI.